(12) United States Patent
Kratz (10) Patent No.: US 7,341,408 B2
(45) Date of Patent: Mar. 11, 2008

(54) TOOL

(75) Inventor: Hubert Kratz, Bedburg-Kirchher (DE)

(73) Assignee: Seco Tools AB, Fagersta (SE)

( * ) Notice: Subject to any disclaimer, the term of this patent is extended or adjusted under 35 U.S.C. 154(b) by 94 days.

(21) Appl. No.: 11/307,781

(22) Filed: Feb. 22, 2006

(65) Prior Publication Data

US 2006/0188347 A1   Aug. 24, 2006

(30) Foreign Application Priority Data

Feb. 22, 2005  (SE) .................................. 0500413
Mar. 29, 2005  (SE) .................................. 0500699

(51) Int. Cl.
*B23B 27/16*   (2006.01)

(52) U.S. Cl. ....................... 407/113; 407/114; 407/115; 407/116

(58) Field of Classification Search ........ 407/113–116; *B23B 27/16*
See application file for complete search history.

(56) References Cited

U.S. PATENT DOCUMENTS

| | | | | |
|---|---|---|---|---|
| 5,222,843 A | * | 6/1993 | Katbi et al. ................. | 407/114 |
| 5,634,745 A | * | 6/1997 | Wiman et al. ............... | 407/113 |
| 5,904,450 A | * | 5/1999 | Satran et al. ................ | 407/113 |
| 6,146,063 A | * | 11/2000 | Ramold et al. ............. | 407/113 |
| 6,623,217 B2 | * | 9/2003 | Brockett et al. ............ | 407/114 |
| 7,008,148 B2 | * | 3/2006 | Wiman et al. .............. | 407/113 |
| 2004/0146365 A1 | * | 7/2004 | Usui et al. .................. | 407/113 |

* cited by examiner

*Primary Examiner*—Monica Carter
*Assistant Examiner*—Sara Addisu
(74) *Attorney, Agent, or Firm*—WRB-IP LLP (57) ABSTRACT

A metal cutting insert that is primarily intended for turning operations includes an upper surface, a lower surface substantially parallel with the upper surface, and at least three side surfaces extending between the upper and lower surfaces. A transition between two adjacent side surfaces forms a rounded nose radius surface at a cutting insert corner. The cutting insert includes a peripheral land bridging the upper and side surfaces at least at the corner portion at a chamfer angle. An intersection of the land and the nose radius surface forms a nose cutting edge. The nose cutting edge is defined by at least one radius. The cutting corner includes at least one curved wiper edge. The chamfer angle in a cross-section at the nose cutting edge is smaller than the chamfer angle in a cross-section a distance away from the nose cutting edge. The chamfer angle has a minimum at a bisector of the corner portion.

17 Claims, 7 Drawing Sheets

TOOL

BACKGROUND AND SUMMARY

The present invention relates to a metal cutting insert that is primarily intended for turning operations.

For all sorts of turning operations, there is a certain interplay between the feed rate and the corner radius, the corner radius being the connection between the main cutting edge and the secondary cutting edge. The surface fineness produced on the workpiece is specifically influenced by the interplay between the corner radius and the feed rate. The approach angle is defined as the angle between the main cutting edge and the direction of feed. This angle has a considerable influence on the interrelation between the different cutting force components, and thereby also on the surface fineness and dimension accuracy. Surface fineness and dimension accuracy are very sensitive to changes of the approach angle. One problem for all turning operations is to obtain the desired surface fineness. Another problem is short tool life due to for example crater wear.

It is desirable to provide a cutting insert that improves the fineness of the machined surface.

It is desirable to provide a cutting insert that significantly improves tool life.

It is desirable to provide a cutting insert that improves surface finish over the total tool life.

It is desirable to provide a cutting insert that increases compressive residual stresses in the work piece subsurface.

It is desirable to provide a cutting insert that increases hardness in the workpiece rim zone.

It is desirable to provide a cutting insert that reduces the sensitivity of a turning cutting insert relative to the positioned approach angle.

It is desirable to provide a versatile cutting insert.

In accordance with an aspect of the present invention, a cutting insert for turning comprises an upper surface, a lower surface substantially parallel with the upper surface, and at least three side surfaces extending between the upper and lower surfaces, a transition between two adjacent side surfaces forming a rounded nose radius surface at a cutting insert corner, a peripheral land bridging the upper surface and side surfaces at least at the corner portion at a chamfer angle, and an intersection of the land and the nose radius surface forming a nose cutting edge, the nose cutting edge being defined by at least one radius, the cutting corner comprising at least one curved wiper edge, wherein the chamfer angle in a cross-section at the nose cutting edge is smaller than the chamfer angle in a cross-section a distance away from the nose cutting edge and the chamfer angle has a minimum at a bisector of the corner portion.

BRIEF DESCRIPTION OF THE DRAWINGS

The objects and advantages of the invention will become apparent from the following detailed description of preferred embodiments thereof in connection with the accompanying drawing in which like numerals designate like elements, and in which.

DETAILED DESCRIPTION

Figure 8:
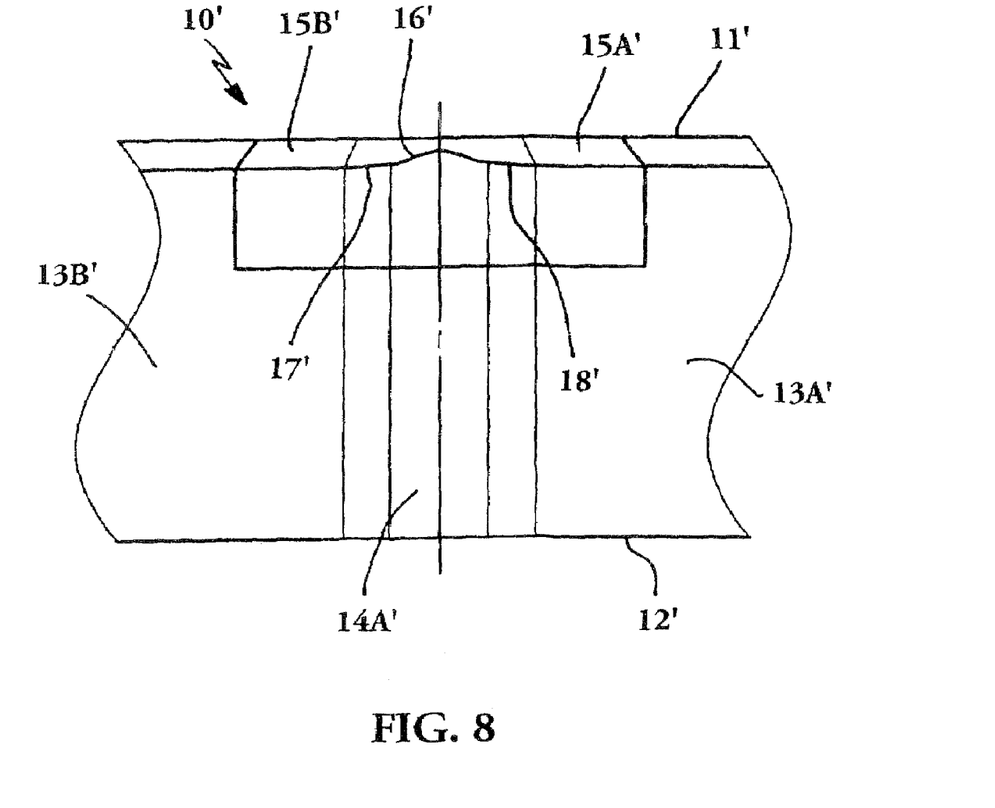
FIG. 8 shows an alternative embodiment of a cutting insert according to the present invention in a view similar to FIG. 5.

In FIGS. 1 to 5 a turning cutting insert 10 according to the present invention is shown. The cutting insert may be either single- or double-sided. The cutting insert is rhombic, the corner portion shown in FIG. 1 having a nose angle of about 60 to 80°. However, it may also be square, rectangular, triangular or hexagonal. When it is hexagonal, it may also be in the form of a so-called trigonal insert. The insert in this embodiment is made of cemented carbide having a cubic boron nitride (CBN) corner portion, but may also be made completely of any of those materials or of any other suitable material. The cutting insert 10 comprises an upper surface 11, a lower surface 12 substantially parallel with said upper surface, and at least three side surfaces 13A, 13B extending between said upper and lower surfaces. The upper surface 11 is planar in this embodiment and extends perpendicularly relative to said at least three side surfaces. A transition between two adjacent side surfaces 13A, 13B forms a rounded nose radius surface 14A at a cutting insert corner 14. The cutting insert 10 comprises a peripheral land 15, constituted by at least two peripheral lands 15A and 15B, bridging the upper and side surfaces at least at the corner portion 14. The peripheral lands 15A and 15B in this embodiment may extend along the entire cutting insert periphery. The peripheral lands 15A and 15B in this embodiment are of different configuration. The peripheral lands 15A and 15B slope at chamfer angles $\beta A$-$\beta E$ (as illustrated by FIGS. 3A-3E) relative to a plane P containing the upper surface 11. The peripheral land is adapted to strengthen the cutting edges of the cutting insert. In this embodiment the upper surface 11 is planar and connects directly to the peripheral land 15 to allow a strong configuration. An intersection of the peripheral land and the nose radius surface 14A forms a nose cutting edge 16. The nose cutting edge 16 is defined by at least one radius R1. Each operative cutting corner 14 comprises at least one convex wiper edge 17, 18 connected to the nose cutting edge 16. In this embodiment there is provided a first 17 and a second 18 wiper edge separated by the nose cutting edge 16. The nose radius surface 14A may be symmetrical with respect to the corner bisector B (as shown in FIG. 8). The cutting insert 10 in this embodiment has a through-going hole 21 extending perpendicularly to the surfaces 11 and 12. Referring especially to FIGS. 3C and for example 3E, the chamfer angle $\beta C$ in a cross-section at the nose cutting edge 16 is smaller than the chamfer angle $\beta E$ in a cross-section a distance away from the nose cutting edge 16. The chamfer angle βC in the cross-section at the nose cutting edge 16 is smaller than the chamfer angle in a cross-section at said second 18 wiper edge but greater than the chamfer angle βA in a cross-section at said first wiper edge 17. Each peripheral land 15A and 15B follows a substantially straight line in a cross-section through the cutting insert 10, such as shown in FIGS. 3A-3E. The peripheral land 15 has a continuously varying chamfer angle β at the corner portion 14. The chamfer angle βC, in a cross-section as illustrated by FIG. 3C at the nose cutting edge 16, is smaller than the chamfer angle βE in a cross-section at the second wiper edge 18. The peripheral land 15 in a plan view has a substantially constant width WA-WE, as illustrated by FIGS. 3A-3E. The land width WE is however slightly larger than the widths WA-WD. Alternatively, the land widths may vary similar to the variations of the chamfer angle.

The first wiper edge 17 is defined by at least one first wiper radius R2 and the second wiper edge 18 is defined by at least one second wiper radius R3, said radii R1-R3 have different points of origin. The radii R2 and R3 can be equally large. The peripheral land 15 at each first and second wiper edge 17, 18 has a continuously varying chamfer angle β.

Figure 6A:
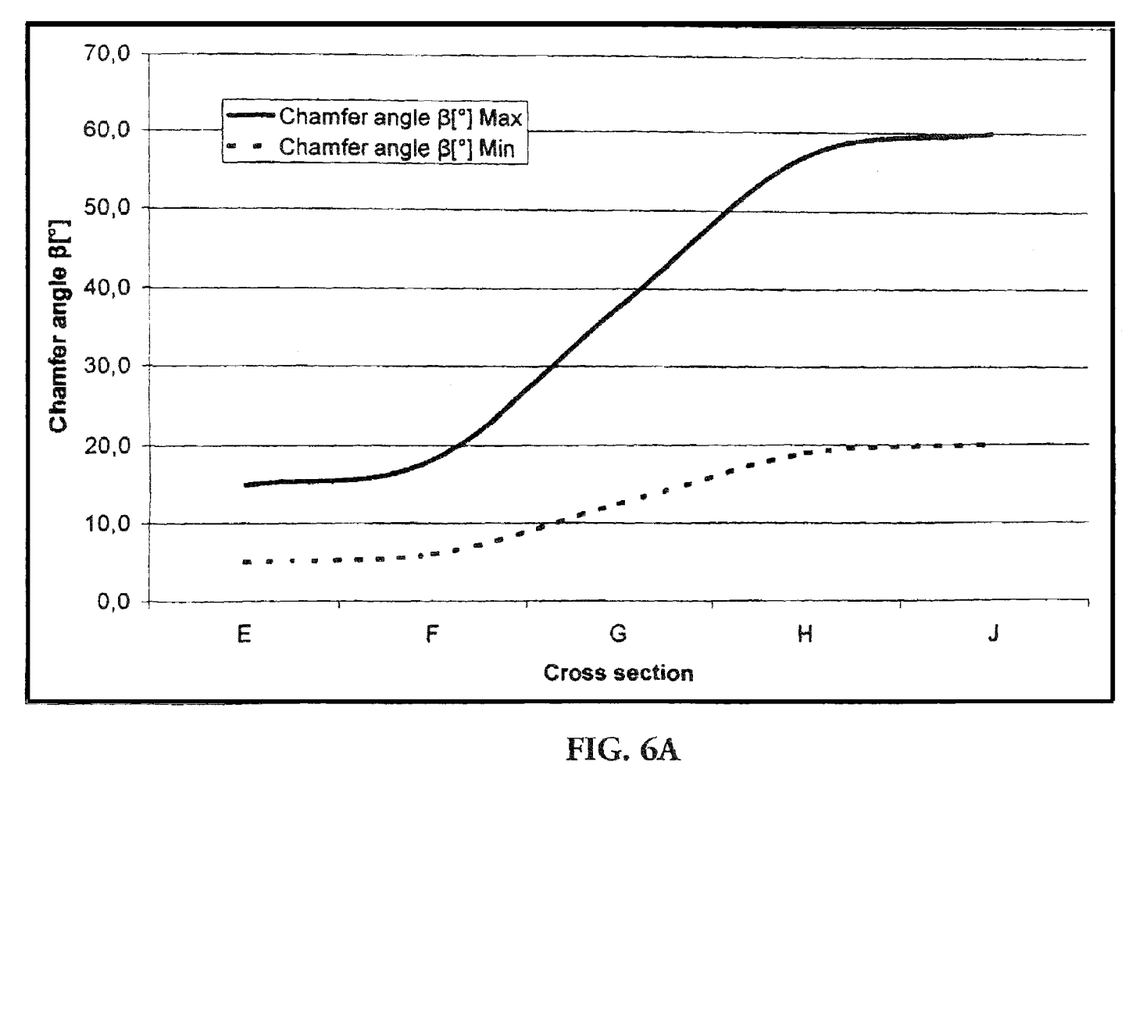
FIG. 6A shows a graph of chamfer angle range at the different cross-sections according to lines E-J in FIG. 1.
Figure 6B:
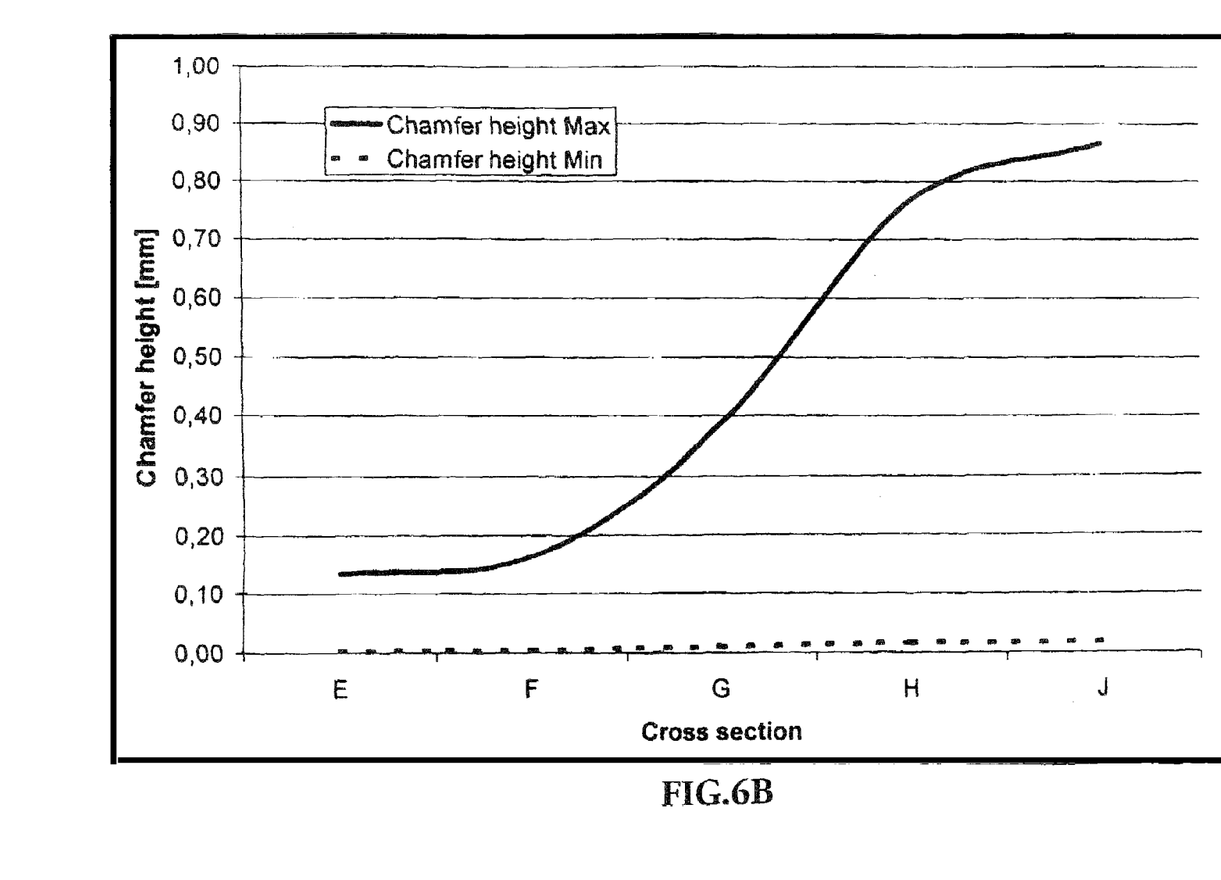
FIG. 6B shows a graph of chamfer height at the different cross-sections according to lines E-J in FIG. 1.

Referring to FIGS. 3A-3E and FIGS. 6A and 6B, the angle β can be chosen in the following order βA<βB<βC<βD<βE, that is for a right hand version of the cutting insert 10. The angle βA is chosen within the range of 5 to 15°; the angle βB is chosen within the range of 6.1 to 18.2°; the angle βC is chosen within the range of 12.5 to 37.5°; the angle βD is chosen within the range of 18.9 to 56.8°, and the angle βE is chosen within the range of 20 to 60°. Furthermore, the projected height Z of the chamfer when viewed perpendicular to the side surface 13A, 13B or nose radius surface 14A may vary in the ranges disclosed in FIG. 6B or as follows (in mm):

| A | B | C | D | E |
|------|------|------|------|------|
| 0.00 | 0.01 | 0.01 | 0.02 | 0.02 |
| 0.13 | 0.16 | 0.38 | 0.77 | 0.87 |

Figure 7A:
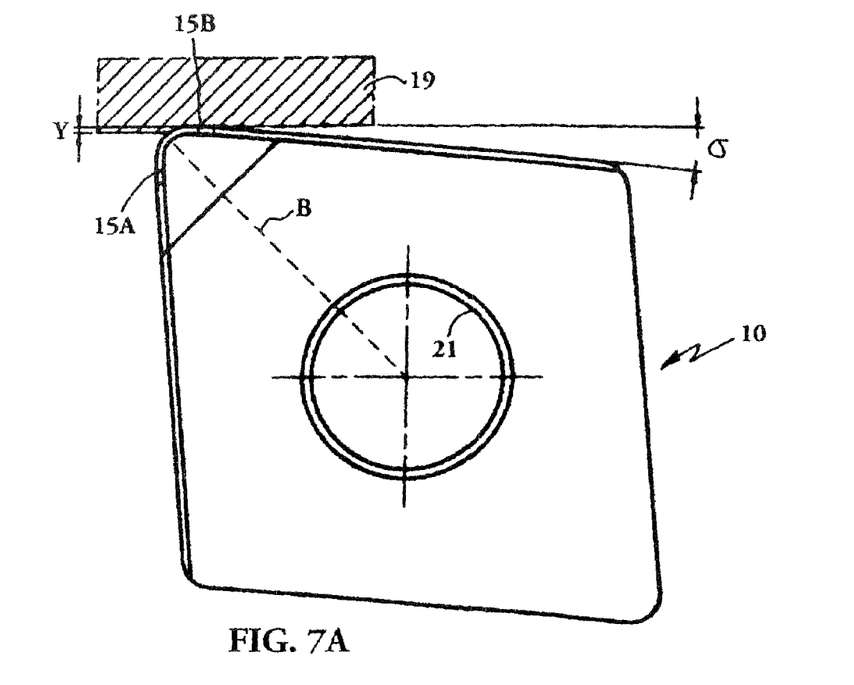
FIG. 7A shows the cutting insert during turning of a work piece and FIG. 7B shows portions of the cutting insert and the workpiece.
Figure 7B:
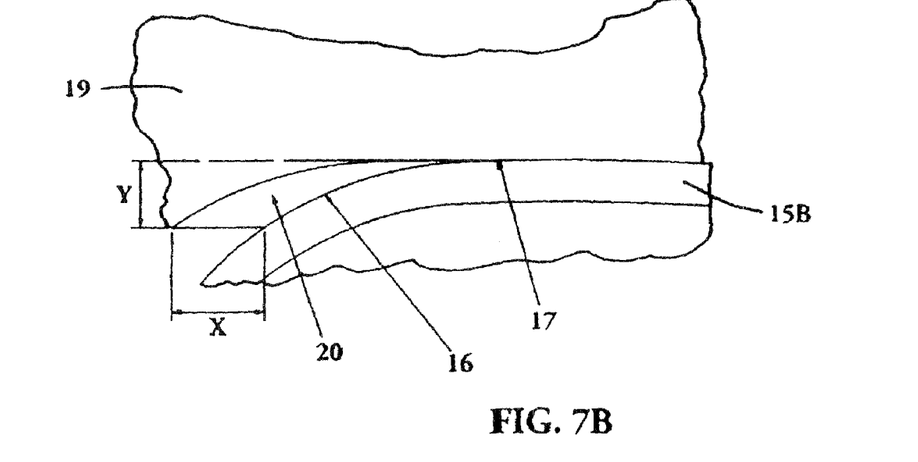

Referring now to FIGS. 7A and 7B that show the cutting insert during right-hand turning of a work piece 19 and an enlarged portion of the cutting insert and the workpiece during a hard turning process, respectively. Usually the depth of cut Y is equal to or less than the nose cutting edge radius R1, such that the uncut material for example does not reach the bisector B. The insert is positioned with a clearance angle σ beyond the wiper edge 17. The size of the chip 20 to be removed is determined by the depth of cut Y and the feed per revolution X. The thickness of the chip transfers into zero at the convex wiper edge 17. The peripheral land 15 has a chamfer that has the highest sharpness at the bisector of the corner portion 14, i.e. lowest values of chamfer angle. The wiper edge 17 that cuts the thin part of the chip is the most blunt chamfer. The bluntness of the wiper edge 17 can be correlated with the degree of plastic deformation (fineness of the surface) and in turn the generated residual stress due to mechanical effect.

Figures 1, 3A:
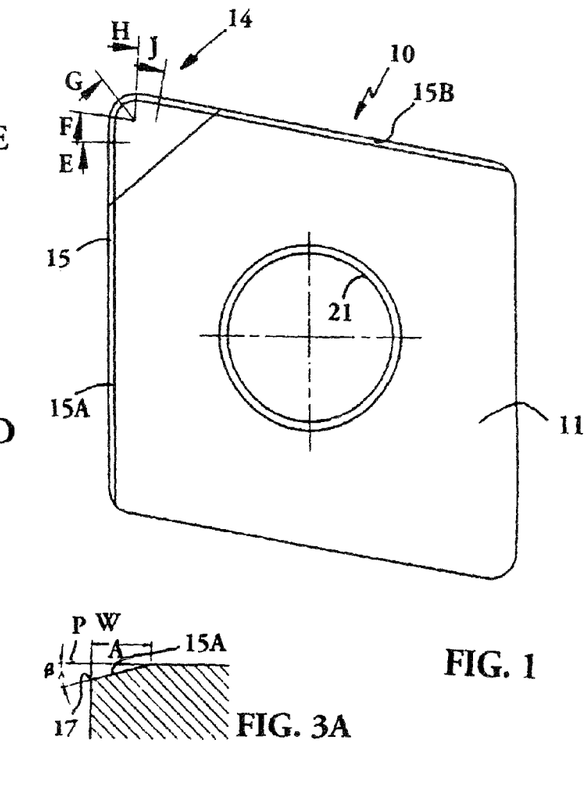
FIG. 1 shows a plan view of a turning cutting insert according to the invention.
FIG. 3A shows a cross-section according to the line E in FIG. 1.
Figure 2:
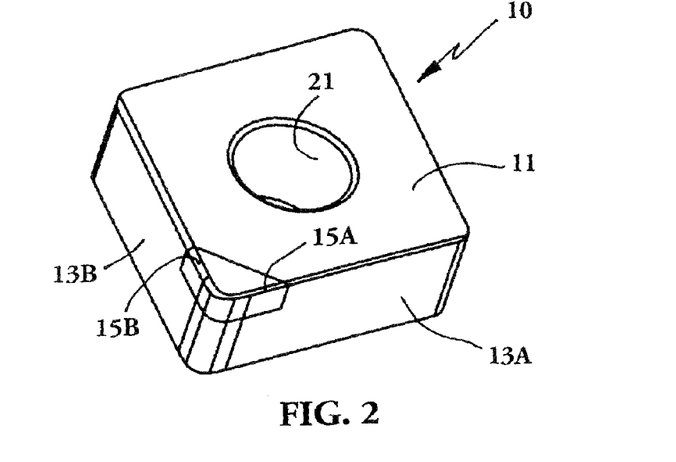
FIG. 2 shows the cutting insert in a perspective view.
Figure 3B:
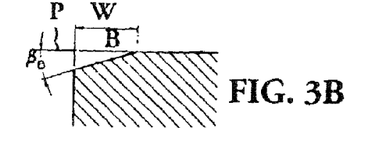
FIG. 3B shows a cross-section according to the line F in FIG. 1.
Figure 3C:
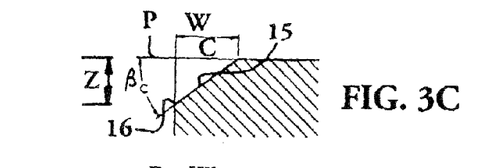
FIG. 3C shows a cross-section according to the line G in FIG. 1.
Figure 3D:
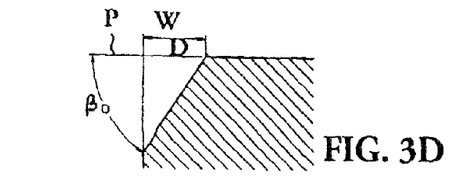
FIG. 3D shows a cross-section according to the line H in FIG. 1.
Figure 3E:
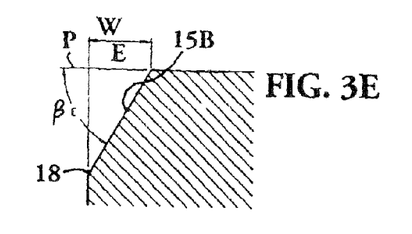
FIG. 3E shows a cross-section according to the line I in FIG. 1.
Figure 4:
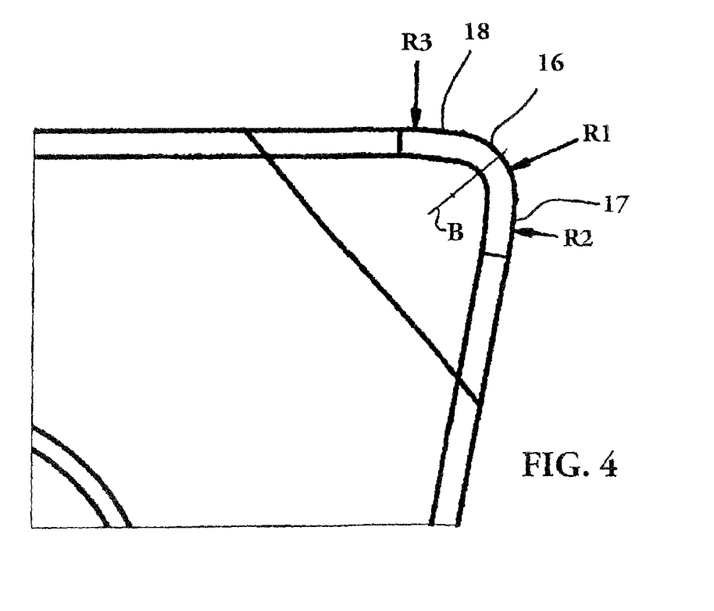
FIG. 4 shows a plan view of a corner portion of the cutting insert in magnification.
Figure 5:
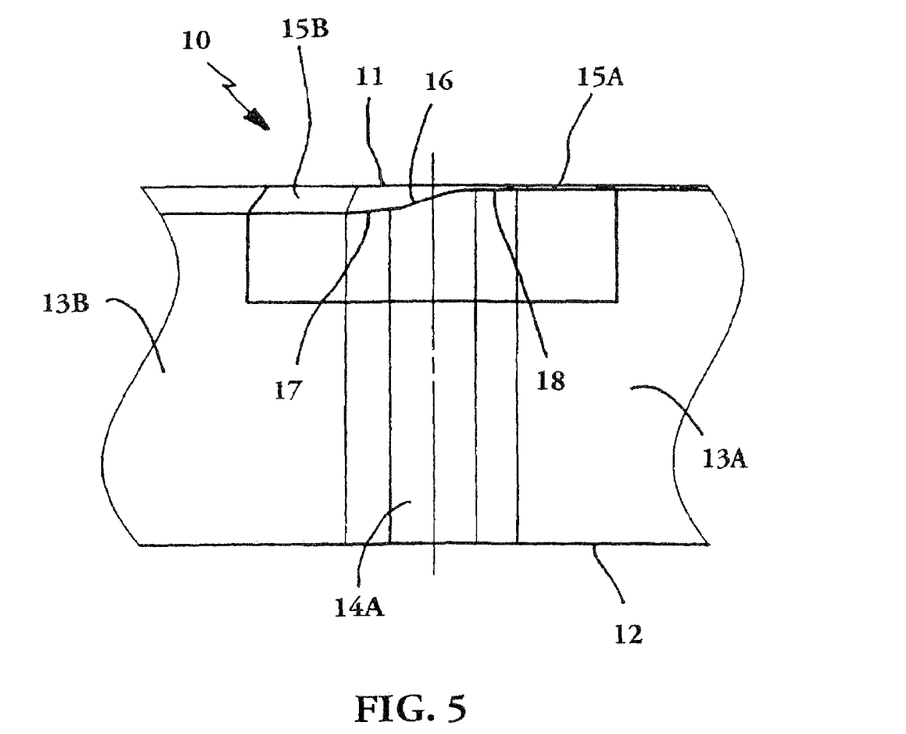
FIG. 5 shows the corner portion in a side view.

FIG. 8 shows an alternative embodiment of a cutting insert 10' according to the present invention in a view similar to FIG. 5. The major difference between this cutting insert 10' in relation to the above-captioned cutting insert 10 is that the peripheral lands 15A' and 15B' are identical. The peripheral lands 15A' and 15B' slope at chamfer angles βC-βE (as illustrated by FIGS. 3C-3E) relative to a plane containing the upper surface 11'. The smallest chamfer angle βC is provided at a bisector B of the corner portion, i.e. it has a minimum at the bisector B. An intersection of the peripheral lands and the nose radius surface 14A' forms the nose cutting edge 16'. The nose cutting edge 16' is defined by at least one radius. Each operative cutting corner comprises at least one convex wiper edge connected to the nose cutting edge 16'. In this embodiment there is provided a first 17' and a second wiper edge 18' separated by the nose cutting edge 16'. The nose radius surface 14A' is symmetrical with respect to the corner bisector B. This results in the advantage that the cutting insert becomes symmetrical, thereby enabling both left-hand and right-hand turning with the same insert, i.e., both left-hand and right-hand holders may be used.

In the described embodiments the active corner of the cutting insert is a section of CBN and thus the cutting edges 16, 17 and 18 are comprised of CBN. Alternatively any other suitable cutting material can be used all due the machining application.

The result of the hard turning process is a function of the development of cutting insert wear, e.g., increasing surface roughness, decreasing compressive stresses and increasing tensile stresses in the workpiece rim zone (or subsurface) and increasing workpiece (micro)hardness. The results in short summary compared to normal standard wiper inserts are significant increase of tool life, better surface finish over the total tool life with increase in tool life, increase of achievable compressive residual stresses in the surface (compression in the work piece surface) and increase of micro hardness in the surface. Furthermore, tests have proven that crater wear at the corner portion at a cutting insert according to the present invention grows distant from the nose cutting edge thereby keeping the cutting edge intact for a long period of time in relation to prior art inserts. Thus, a cutting insert for turning is proposed that improves the fineness of the machined surface and significantly improves tool life. The cutting insert improves versatility, equal performance running left or right hand operations and still differentiating the effective chamfer angle as much as possible.

The disclosures in Swedish patent application Nos. 0500413-0, filed Feb. 22, 2005, and 0500699-4, filed Mar. 29, 2005, from which this application claims priority are incorporated herein by reference.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A cutting insert for turning, comprising an upper surface, a lower surface substantially parallel with the upper surface, and at least three side surfaces extending between the upper and lower surfaces, a transition between two adjacent side surfaces forming a rounded nose radius surface at a cutting insert corner, a peripheral land bridging the upper surface and side surfaces at least at the corner portion at a chamfer angle, and an intersection of the land and the nose radius surface forming a nose cutting edge, the nose cutting edge being defined by at least one radius, the cutting corner comprising at least one curved wiper edge, wherein the chamfer angle in a cross-section at the nose cutting edge is smaller than the chamfer angle in a cross-section a distance away from the nose cutting edge and the chamfer angle has a minimum at a bisector of the corner portion.

2. The cutting insert according to claim 1, wherein the chamfer angle in the cross-section at the nose cutting edge is smaller than the chamfer angle in a cross-section at the wiper edge.

3. The cutting insert according to claim 2, wherein the peripheral land follows a substantially straight line in a cross-section through the cutting insert.

4. The cutting insert according to claim 2, wherein the peripheral land has a continuously varying chamfer angle at the corner portion.

5. The cutting insert according to claim 4, wherein the chamfer angle in a cross-section at the nose cutting edge is smaller than the chamfer angle in a cross-section at a first wiper edge.

6. The cutting insert according to claim 2, wherein the peripheral land in a plan view has a substantially constant width.

7. The cutting insert according to claim 2, wherein the cutting corner comprises a first wiper edge being defined by at least one radius and a second wiper edge being defined by at least one radius, the radii have different points of origin.

8. The cutting insert according to claim 7, wherein each first and second wiper edge has a continuously varying chamfer angle.

9. The cutting insert according to claim 2, wherein the cutting insert partly or completely is comprised of cubic boron nitride.

10. The cutting insert according to claim 1, wherein the chamfer angle in the cross-section at the nose cutting edge is smaller than the chamfer angle in a cross-section at the wiper edge.

11. The cutting insert according to claim 1, wherein the peripheral land follows a substantially straight line in a cross-section through the cutting insert.

12. The cutting insert according to claim 1, wherein the peripheral land has a continuously varying chamfer angle at the corner portion.

13. The cutting insert according to claim 12, wherein the chamfer angle in a cross-section at the nose cutting edge is smaller than the chamfer angle in a cross-section at a first wiper edge.

14. The cutting insert according to claim 1, wherein the peripheral land in a plan view has a substantially constant width.

15. The cutting insert according to claim 1, wherein the cutting corner comprises a first wiper edge being defined by at least one radius and a second wiper edge being defined by at least one radius, the radii have different points of origin.

16. The cutting insert according to claim 15, wherein each first and second wiper edge has a continuously varying chamfer angle.

17. The cutting insert according to claim 1, wherein the cutting insert partly or completely is comprised of cubic boron nitride.

* * * * *